Patented Aug. 23, 1932

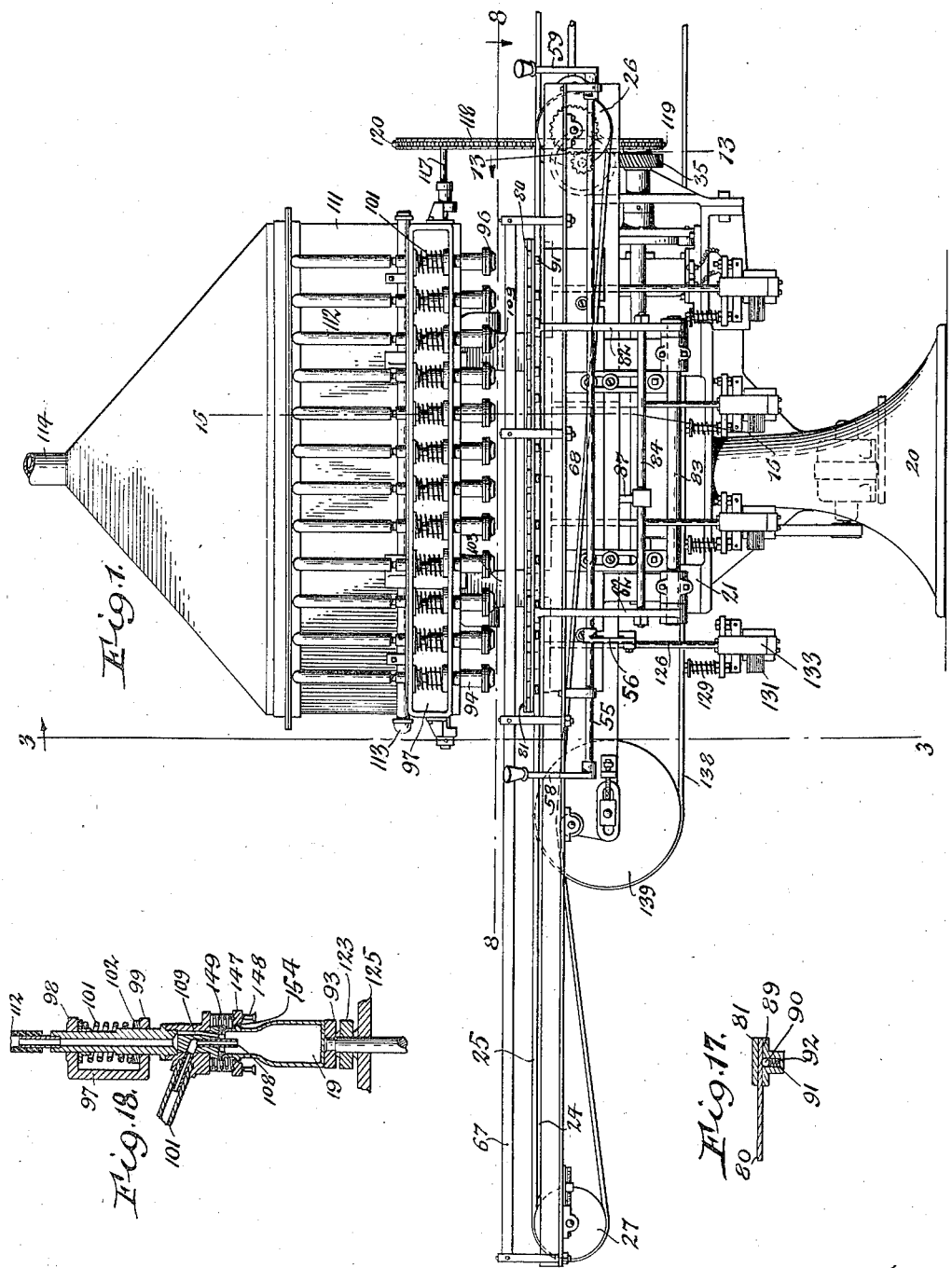

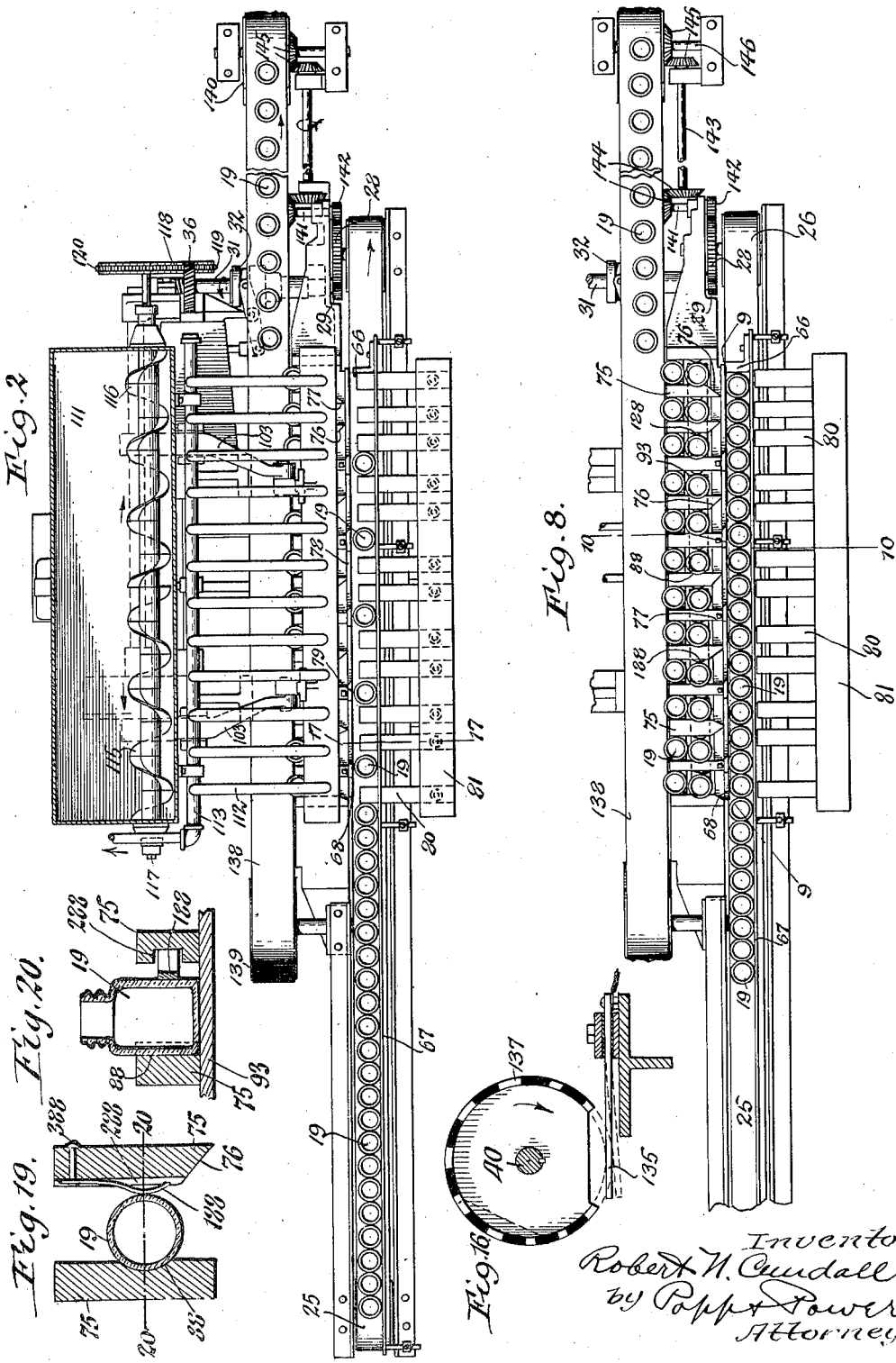

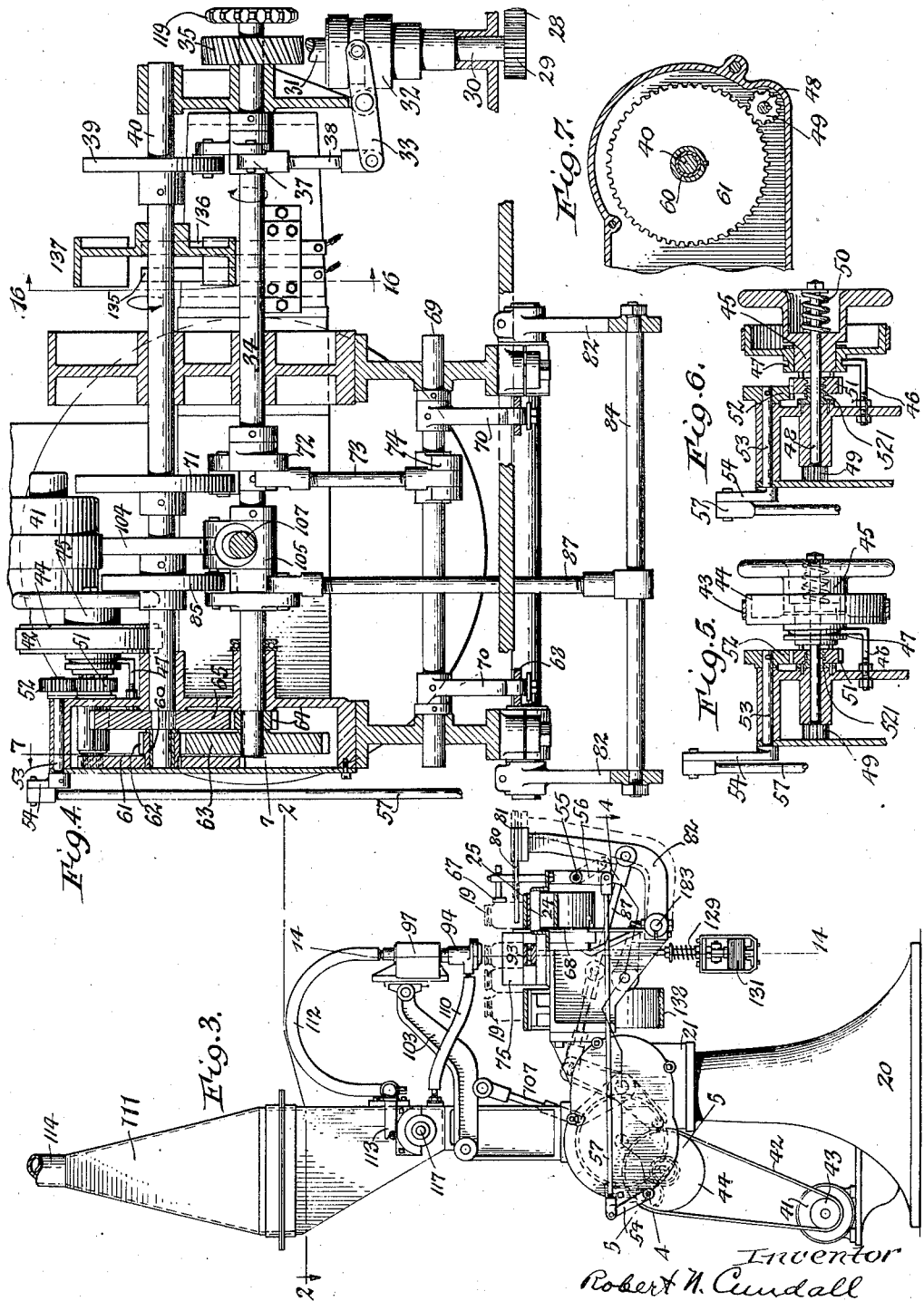

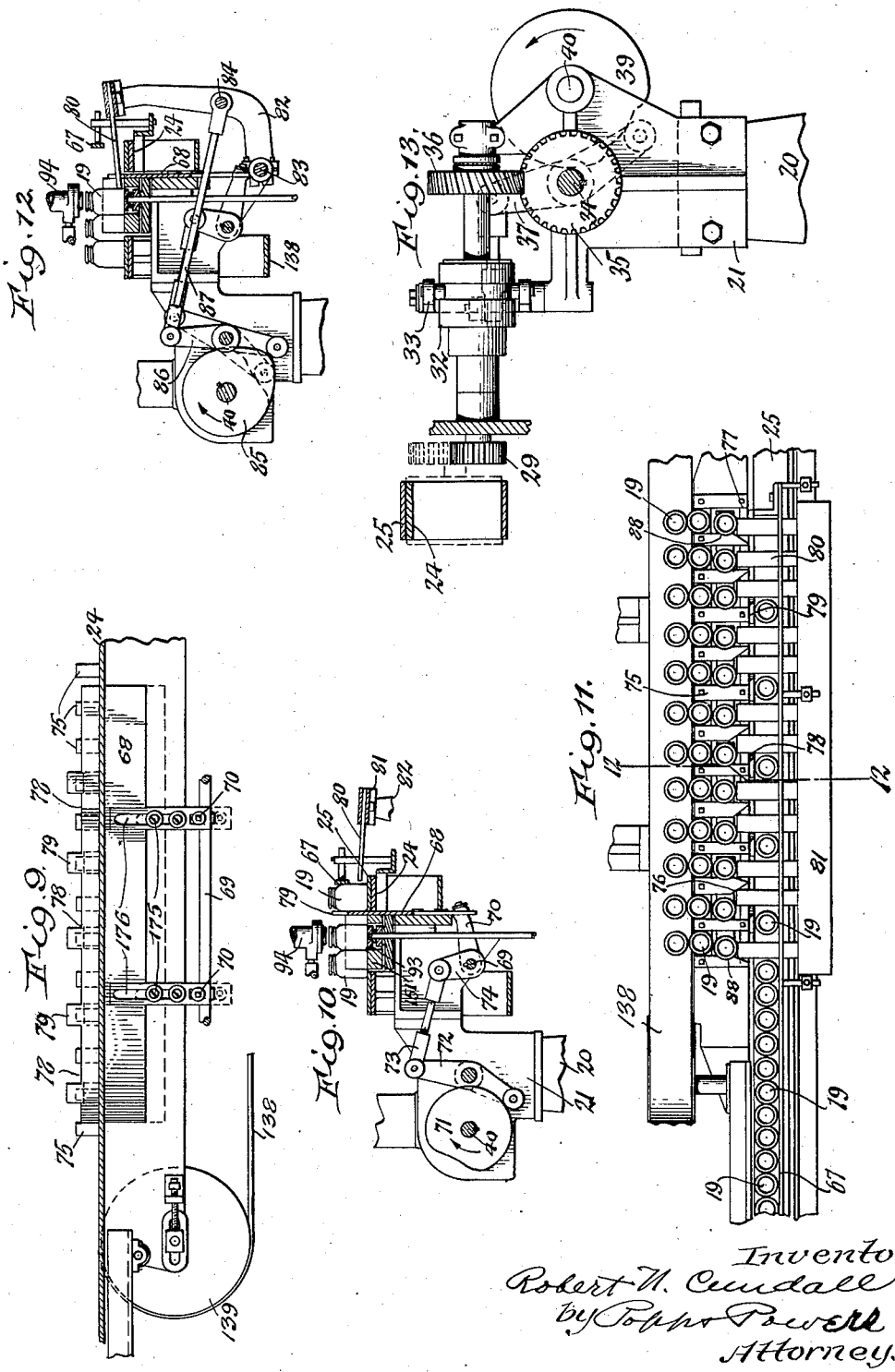

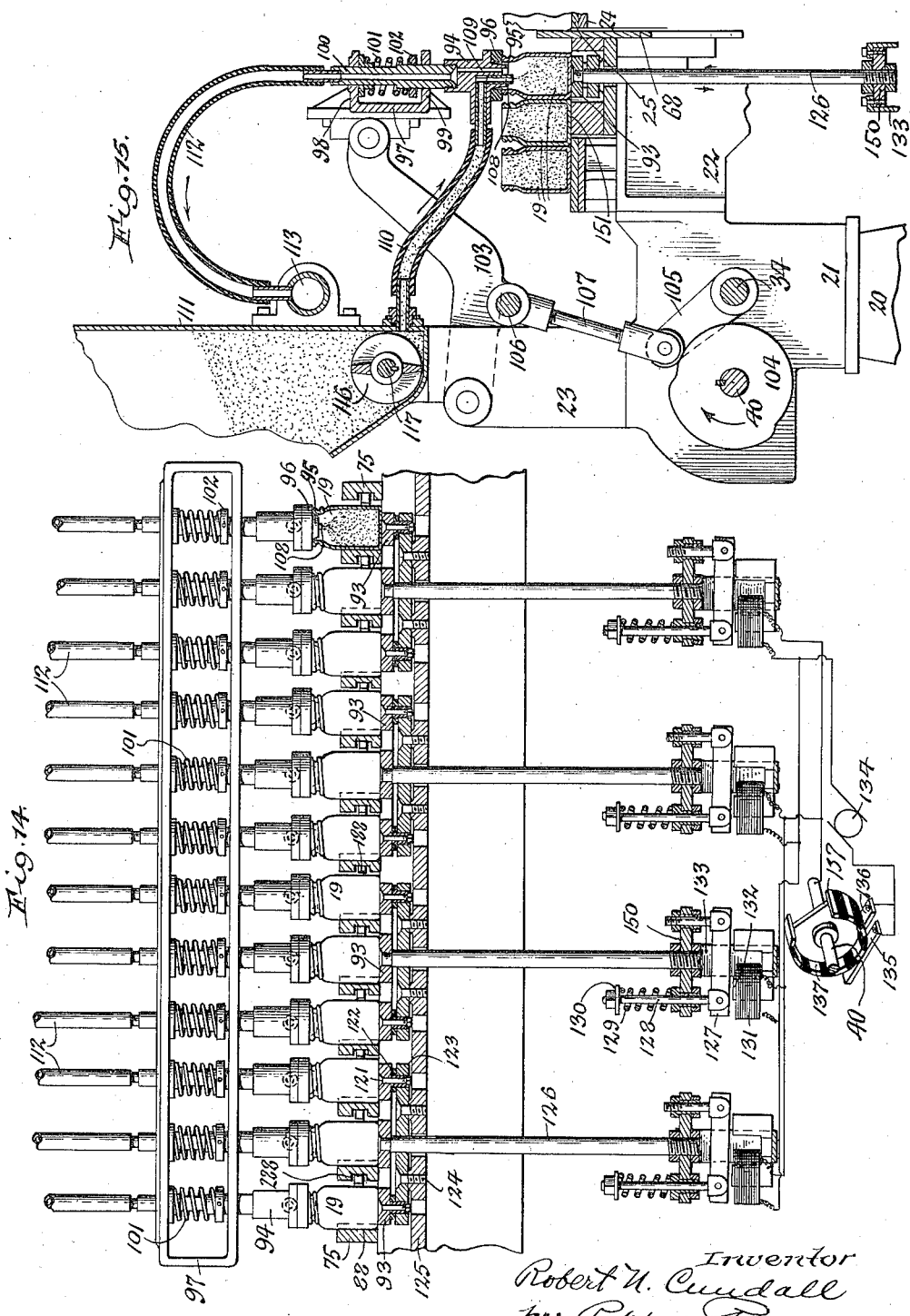

1,872,686

UNITED STATES PATENT OFFICE

ROBERT N. CUNDALL, OF BLASDELL, NEW YORK, ASSIGNOR, BY MESNE ASSIGNMENTS, TO CONSOLIDATED PACKAGING MACHINERY CORP.

MACHINE FOR FILLING CONTAINERS

Application filed September 8, 1928. Serial No. 304,780.

This invention relates to a machine for filling dry powdered or granular material from a mass or bulk into containers of various types, kinds and forms, and more particularly to a machine of this character in which the handling of the material throughout from the reservoir holding the bulk powder to the container is effected without exposing the powder to the air externally of the machine.

It is the object of this invention to provide a machine whereby this function is accomplished readily, efficiently, reliably and economically.

In the accompanying drawings:

Figure 1 is a front elevation of a machine constructed in accordance with this invention.

Figure 2 is a horizontal section taken on line 2—2, Fig. 3.

Figure 3 is a vertical section taken on line 3—3, Fig. 1.

Figure 4 is a fragmentary horizontal section, on an enlarged scale, taken on line 4—4, Fig. 3.

Figure 5 is a fragmentary horizontal section, taken on line 5—5, Fig. 3 and showing the main driving clutch coupled.

Figure 6 is a similar view showing the main driving clutch uncoupled.

Figure 7 is a fragmentary cross section taken on line 7—7, Fig. 4.

Figure 8 is a horizontal section, taken on line 8—8, Fig. 1.

Figure 9 is a fragmentary vertical longitudinal section taken on line 9—9, Fig. 8.

Figure 10 is a fragmentary vertical transverse section taken on line 10—10, Fig. 8.

Figure 11 is a view similar to Fig. 8 but showing the gate lowered and the transfer fingers in their projected operative position.

Figure 12 is a fragmentary vertical section taken on line 12—12, Fig. 11.

Figure 13 is a fragmentary vertical section on line 13—13, Fig. 1.

Figure 14 is a vertical longitudinal section, on an enlarged scale, taken on line 14—14, Fig. 3.

Figure 15 is a vertical section, on an enlarged scale, taken on line 15—15, Fig. 1.

Figure 16 is a fragmentary vertical section taken on line 16—16, Fig. 4.

Figure 17 is a vertical section taken on line 17—17, Fig. 2.

Figure 18 is a fragmentary vertical section similar to Fig. 15 and showing a modified form of sealing head for coupling the powder filling mechanism with the inlet of the container.

Figure 19 is a top plan view, on enlarged scale, of one of the container guide ways showing the means for centering the container relative to the respective filling head.

Figure 20 is a section taken on line 20—20, Figure 19.

In the following description similar characters of reference indicate like parts in the several figures of the drawings.

In its general organization this filling machine comprises container feeding means for promiscuously supplying the containers 19 which are to be filled, a filling mechanism whereby the powdered material is taken from bulk and delivered into the containers, container delivery means whereby the filled containers are discharged from the machine, transfer mechanism whereby the containers are shifted from the feeding means to the filling mechanism and to the delivery means, means for spacing the containers relative to the filling mechanism, and means for vibrating the containers which are being filled so as to settle the material and insure maximum filling of the containers.

The stationary main frame of the machine upon which the working parts are mounted may be of any suitable construction but the same, as shown in the drawings, preferably, comprises a pedestal 20, and a base 21 mounted on this pedestal and provided with forwardly projecting front brackets 22 and upwardly projecting rear brackets 23.

Arranged horizontally and lengthwise along the front part of the machine and mounted on the front part of the frame is a supporting plate 24 over which runs the upper active stretch of a container, conveyor or feeding belt 25, the lower inactive stretch of which is arranged below this plate and the front and rear turns of which pass around pulleys 26, 27 mounted to turn on opposite ends of the main frame.

This feeding belt is moved intermittently so that its upper stretch advances when the filling mechanism is in operation and at this time feeds containers forwardly to the transfer position and while the filling mechanism is not in operation, the operation of the feeding belt also ceases and during this time the transfer mechanism moves the containers from the feed belt to the filling mechanism.

Various means may be employed for automatically operating the feeding belt in this manner, those shown in the drawings being preferred and constructed as follows:—

The numeral 28 represents a driven gear wheel connected with the front feed belt pulley 26 and meshing with a driving pin 29 which is mounted on a transverse driven shaft 30 journaled on the adjacent part of the frame. A transverse driving shaft 31 arranged in line with the driven shaft 30 is adapted to be coupled with the same and uncoupled therefrom by a clutch 32 which is operated by a rock lever 33. Motion is transmitted from a main longitudinal driving shaft 34 to the transverse driving shaft 31 by a pair of intermeshing spiral gear wheels 35, 36. Intermittent rocking of the lever 33 for coupling and uncoupling the clutch 32 is effected by a vertical cam lever 37 connected at one end by a link 38 with the clutch lever 33 while its opposite end is engaged by a rotary cam 39 mounted on a longitudinal horizontal cam shaft 40, as best shown in Figs. 4 and 13. The shafts 34 and 40 may be rotated from any suitable source and in any approved manner, for example by the means which are best shown in Figs. 4, 5 and 6 and which are constructed as follows:—

The numeral 41 represents an electric motor mounted on the pedestal of the frame and 42 represents a belt passing around a driving pulley 43 on the motor shaft and around a driven pulley 44 which turns on a clutch sleeve 45 but is held against longitudinal movement in any suitable manner, for instance by a stationary finger 46 engaging annular groove 47 in the hub of the pulley 44. The sleeve 45 is compelled to turn but is capable of sliding lengthwise on an intermediate shaft 48 which latter is provided with a driving pinion 49.

The clutch sleeve 45 is yieldingly held in engagement with the side of the driving pulley 44 by a spring 50 interposed between the clutch sleeve and a shoulder on the intermediate shaft for coupling the clutch and separation of the sleeve 45 from the driving pulley 44 for uncoupling this clutch is effected by a pinion screw nut 51 having its internal screw thread engaging with an externally threaded screw stem 521 secured to an adjacent stationary part of the frame and bearing with its front side against the clutch sleeve 45 so that upon turning the nut 51 in one direction the clutch sleeve 45 will be coupled with the pulley 44 and upon turning the nut 51 in the opposite direction this sleeve and pulley will be uncoupled. Turning of the nut 51 is effected by a gear segment 52 meshing with the pinion nut 51, a rock shaft 53 carrying said gear segment 52, a rock arm 54 secured to the rock shaft 53, a main controlling shaft 55 arranged lengthwise on the front part of the machine and having a lower rock arm 56 which is connected by a rod 57 with the rock arm 54, and two upper rock arms 58, 59 arranged on the rear and front parts of the shaft 55 and adapted to be manipulated by the attendant for starting and stopping the machine.

Motion is transmitted from the clutch shaft 48 to the main shaft 34 by a sleeve 60 turning on the shaft 40 and having a gear wheel 61 meshing with the pinion 49, and also provided with a pinion 62 meshing with a gear wheel 63 on the shaft 34. Motion is imparted to the shaft 40 by a gear pinion 64 secured to the shaft 34 and meshing with a gear wheel 65 on the shaft 40.

The containers 19 are placed with their lower ends or bottoms on the receiving end of the upper stretch of the feeding belt and are carried by the same in single file forwardly until the foremost one of the file engages a stationary stop 66 arranged over the delivery part of this belt and mounted on an adjacent part of the main frame. When the foremost container of the file engages the stop 66 the remaining containers are successively brought to rest by engaging each other while the feeding belt slips along the lower ends thereof so long as the same moves independently of the containers. While the containers are moving with the upper stretch of the feeding belt the same are guided between a stationary front rail 67 arranged lengthwise and horizontally in front of the path of the container and mounted on the main frame, and a vertically movable gate 68 arranged lengthwise in rear of the path of the containers. This gate is raised while the containers are being moved toward the front or delivery part of the feeding belt and at intervals this gate is lowered to permit some of the containers on the delivery part of the feeding belt to be pushed laterally rearward from this belt and into a position in which the containers are filled with powdered material. The descent of this gate is effected by gravity and the raising of the same is effected by a longitudinal rock shaft 69 journaled horizontally on the main frame and provided with two forwardly projecting rock arms 70 connected with the lower part of the gate, a rotary cam 71 arranged on the cam shaft 40, and a rock lever 72 turning on the main shaft 34 and engaging its lower end with the cam 71 while its upper end is connected by a rod 73 with an upwardly projecting rock arm 74 on the rock shaft 69, as best shown in Figs. 4, 9, 10 and 12. During its vertical movements the gate is guided by bolts 175 arranged on the main frame and passing through vertical slots 176 on the lower parts of the gate, as shown in Figs. 9, 10 and 12.

During each cycle of operations of the machine the cam 71 raises the gate 68 and holds it up while the containers are being fed toward the stop 66 and at the proper time the gate is lowered to permit the containers to be pushed laterally from the feeding belt to the filling stations.

In order to properly seal the inlets, mouths or openings in the necks of the containers while the same are being filled, the containers must be slightly separated, especially when the diameter of the opening of the container is equal, or nearly so, to the diameter of the body of the container. Means are therefore provided whereby only a predetermined number of containers which have been accumulated in closed ranks on the delivery part of the feeding belt are pushed laterally rearward from the same to the filling stations, leaving some of the containers still resting on the feeding belt and thereby securing a clearance space between adjacent containers at the several filling stations which permits forming a properly sealed connection with the filling mechanism.

The machine shown in the drawings is designed for filling twelve containers at a time and in order to secure the necessary spacing apart of these containers at the filling stations the same are selected or removed from a batch of seventeen containers which are arranged in single file on the delivery part of the feeding belt. In the preferred organization of this spacing mechanism every third container of the central part of a batch of containers is left behind on the feeding belt while the other twelve are presented to the filling mechanism. The selected containers are guided to the several filling stations by a plurality of transverse guide ways formed by transverse guide bars 75 mounted in a longitudinal row on the main frame in rear of the path of the containers on the feeding belt and spaced from one another and having their front corners bevelled, as shown at 76, while others are left straight as shown at 77.

In line with the front or inlet ends of each of these guideways the upper edge of the gate 68 is provided with a cutout forming a passage 78 while the remaining part of the upper edge of the gate is left the full height so as to form lateral stops 79 which are arranged along the rear lateral side of the several containers which for the time being are withheld from passing to the filling stations. The shifting of the containers from the feeding belt to the filling stations is preferably effected by a plurality of transversely reciprocating transfer or push fingers 80 which are arranged in line with the passages 78 and the inner ends of which are adapted to engage with the outer side of the containers which are to be picked out from a batch and presented to the filling stations and the outer ends of these fingers being mounted on a horizontal shifting bar 81 arranged lengthwise along the outer side of the feeding belt. This shifting bar is mounted on the upper ends of a pair of elbow shaped rock arms 82 the lower ends of which extend inwardly underneath the feeding belt and are secured to a longitudinal rock shaft 83 journaled on the main frame in line with a vertical plane located adjacent to the inner edge of the feeding belt, as shown in Fig. 12. The elbow levers 82 drop by gravity for moving the plsh fingers outwardly or backwardly and their upward movement for carrying the push fingers inwardly or forwardly is effected by a cross bar 84 connecting the elbow levers 82, a rotary cam 85 arranged on the cam shaft 40, and a rock lever 86 turning on the main shaft 34 and having one end engaging the cam 85 and the other end connected by a rod 87 with the cross bar 84.

When the gate is in its uppermost position the bottom of the passages 78 are sufficiently high so that the continuous lower part of the gate forms a guard or rail above the feeding belt which operates to prevent the containers from moving inwardly off this belt at this time and when the foremost container engages the stop 66 it cannot be crowded sidewise off the belt toward the filling stations, but instead the belt merely passes under them.

At the proper time the gate is lowered so that the bottoms of the passages or cut-outs 78 are flush with the top of the conveyer or feeding belt and at the same time the forward movement of the feeding belt is arrested. While the containers are thus advancing under the action of the feeding belt the transfer fingers are in their outer retracted position shown in Figs. 8 and 10. After the belt is stopped the gate is lowered, and then the transfer or push fingers 80 are moved inwardly and by engaging the containers in line therewith shift them from the feeding belt into the several guideways between the bars 75 and to the respective filling stations, as shown in Figs. 11 and 12, while those containers in line with the stops 79 of the gate are retained on the feeding belt. Those containers which stand directly in line with the inlets of their respective guideways are pushed straight into the same by the corresponding transfer fingers, this being the case of the second, fourth, sixth and eighth guideways counting from right to left, but the containers for the remaining guideways are deflected more or less in one direction or the other by the inclined faces 76 on the front corners of some of the bars 75 in order to shift the respective containers into their filling positions.

It has been found that containers, particularly those made of glass vary in diameter and it is therefore necessary to make the guideways between the bars 75 sufficiently wide to accommodate the largest container and provide centering means for holding the containers regardless of slight differences in diameter in proper registered position relative to the filling heads. For this purpose the rear side of each guideway is preferably cut out to form a rounded concave seat 88 for receiving the rear side of a container, as shown in Figs. 8 and 11, and providing the front side with a spring 188 opposite the seat 88, which spring is arranged in a groove 288 in the respective wall of the guideway and secured at its outer end thereto by a rivet 388 or other means.

As a container is moved inwardly by a finger 80 the container deflects the centering spring 188 and when the container reaches the concave seat 88 the same is pushed laterally into this seat by the resilience of this spring and is yieldingly held in this position axially in line with the respective filling head for permitting proper delivery of powder into the container even though there may be a difference in diameter between the several containers which are being filled.

As the transfer fingers move backwardly the same hold the spacing containers against forward movement until the fingers have completed their retracting movement, and when this retracting motion of the fingers has been completed as shown in Fig. 2, the feeding belt 25 upon resuming its motion advances the containers so that those on the delivery part which have been withheld to provide the required space between the preceding containers will be gathered closely together as the foremost one reaches the stop and additional containers are added to the lines, as shown in Fig. 8, preparatory to selecting therefrom the next twelve containers to be delivered to the filling positions.

In order to prevent the fingers from breaking or crushing the containers in case one or the other of them should become caught in a guideway for some reason, means are provided for permitting any one of the fingers to slip on the carrying bar 81. These means preferably consist of a guideway 89 on the bar 81 which receives the outer or rear end of the respective finger, and a ball shaped detent 90 which is arranged in a pocket 91 and is frictionally held in engagement with the underside of the respective finger by a spring 92 arranged in said pocket. If a finger engages with a container which has been caught and prevented from moving then the respective finger merely stands still while the carrying bar 81 slides on this finger, due to the frictional engagement of the detent 90 being overcome by the action of the cam 85.

After the clogging container has been removed the finger which has been left behind can be again readily pulled out and restored to its normal operative position on the finger carrying bar.

As the containers are pushed inwardly off the feeding belt the same land on a platform which supports the same in positions to be engaged by the nozzles of the mechanism whereby the powdered material is fed into the containers, which platform in the present instance is preferably constructed in the form of a plurality of sections 93, preferably four in number. These sections are arranged in a longitudinal row along the inner side of the gate and each section is adapted to support a number of the containers, for example three containers, as shown in Fig. 14.

While the containers are thus supported at their filling stations on the platform sections, the powdered material is delivered into the upper open ends of the several containers by the filling mechanism which is preferably constructed as follows:—

The numeral 94 represents a plurality of vertically movable filling heads arranged respectively above the several containers while the latter are at the filling stations and each of these heads being provided at its lower end with a downwardly tapering nozzle 95 adapted to enter the opening of one of the containers upon lowering the respective heads.

Around the nozzle of each head is arranged an elastic packing or sealing ring 96 which is adapted to engage the upper end of a container and form an air tight joint therewith when the head is lowered into its operative position.

The several filling heads are mounted on a vertically movable yoke 97 which latter is provided with upper and lower flanges 98, 99 in which necks 100 on the upper ends of the heads are capable of sliding vertically. Each of these heads is yieldingly held in its lowermost position on the yoke independently of the other heads by a spring 101 surrounding the respective neck and bearing at its upper end against the underside of the flange 98 while its lower end bears against a collar 102 on the neck, which collar also limits the downward movement of the head by engaging the upper side of the lower yoke flange 99.

The downward movement of the yoke and the parts mounted thereon is effected by gravity but the upward movement of the same is effected by means which comprise a pair of vertically swinging levers 103 pivoted at their inner and outer ends respectively to the main frame and said yoke, a rotary cam 104 secured to the shaft 40, a cam rock arm 105 turning on the shaft 34 and engaging with the cam 104, and a cross bar 106 connecting the rock levers 103 and connected by a rod 107 with the cam rock arm 105.

Due to this yielding connection between each filling head and the yoke, each of the heads, upon lowering the yoke, will engage its lower end with the respective container independently of the other heads and thereby enable all of the heads to engage the several containers properly notwithstanding that there may be some variation in the height of the containers or in the thickness of the sealing rings or the position of the heads, inasmuch as the spring 101 of each head will be compressed more or less if the respective head engages its container and is arrested in its downward movement before the yoke completes its downward movement.

Each of the filling heads is provided with an inlet passage 108 which extends downwardly therefrom within the nozzle and an outlet passage 109 which opens at the lower end of the head at a point above the lower end of the inlet passage. The inlet passage extends to the rear side of the head and is connected by a flexible tube 110 with the lower part of a powder supply bin, hopper or reservoir 111 mounted on the adjacent upper rear part of the main frame. The outlet passage 109 communicates with the neck of the respective head and this neck is connected at its upper end by a flexible tube 112 with a suction manifold 113 mounted on a suitable support such as the front side of the reservoir, as shown in Figs. 1, 2, 3 and 15. This suction manifold is connected with an exhaust pump or other suitable exhausting device so that a vacuum is created within the several filling heads and the conduits and containers communicating therewith.

While the filling heads are elevated and not engaged with containers the suction of the pump on the manifold 113 causes the external air to be drawn into the outlet passages of the heads without producing any effect on the powder in the reservoir. When, however, the heads are engaged with the containers, the suction effect of the pump causes air and powder to be drawn from the reservoir through the supply pipes or tubes 110 and as this powder issues from the lower end of the inlet passage 108 the same is separated from the air due to the reversed direction of movement which the air is compelled to take in escaping through the outlet passage 109, thereby causing the liberated powder to drop into the containers and gradually fill the same. When a container has been filled with powder up to the lower end of the inlet passage the continued suction of the pump carries the powder thereafter withdrawn from the reservoir to a separator which may be of any suitable construction, and enables the by-passed powder to be recovered and eventually returned to the reservoir for filling the same into containers.

The filling heads are held in their lowered position a sufficient length of time to ensure complete filling of all of the containers and then the yoke is raised for disengaging the filling heads from the containers, and when this occurs the further withdrawal of powder from the reservoir ceases inasmuch as the vacuum which produced this movement of the powder is broken at the outlet passages of the several filling heads.

The material to be packed may be supplied to the reservoir from any suitable source and in the drawings a pipe 114 is shown leading to the top of the reservoir for replenishing the material when required.

In the absence of any provision to agitate and distribute the material in the reservoir, the same is liable to become packed and flow unevenly into the several filling heads and to meet this condition an agitating and distributing device is provided consisting preferably of a screw conveyer arranged horizontally and lengthwise in the lower part of the reservoir adjacent to the discharge openings leading to the powder supply tubes. In the preferred construction this conveyer consists of two sections 115, 116 which cover equal parts of the reservoir bottom and trend in opposite directions, preferably from the center of the reservoir toward opposite ends thereof so that the mass of powder supplied to the center of the reservoir will be distributed to the several supply tubes of the filling heads and the material will at the same time be agitated and maintained in a loose and free flowing condition.

The shaft 117 of this conveyer is journaled in bearings on the end walls of the reservoir and the same is rotated by a chain belt 118 passing around sprocket wheels 119, 120 secured respectively to the shaft 34 and the conveyer shaft, as best shown in Figs. 1, 2 and 4.

While the containers are being filled with powder the same are preferably vibrated so as to settle the powder compactly and insure filling the same to the maximum capacity. For this purpose means for vibrating the containers are provided which are preferably constructed as follows:—

In order to permit of vibrating the containers while the same are resting on the platform sections 93 at the filling stations each of the sections is secured by bolts 121 to rubber bushings 122 mounted in openings on intermediate plates 123 which latter are secured in turn by screws 124 to the adjacent part of a base plate 125, as best shown in Fig. 14.

Secured to each platform section and extending downwardly therefrom is a vibrating or suspension rod 126 on the lower end of which is mounted a vibrator, preferably of the electric type. As shown in Fig. 14 each of these vibrators consists essentially of an upper cross bar 150 secured to the lower end of the vibrating rod, a vertically swinging armature 127 pivoted at one end to the cross bar 150 and provided at its opposite end with an upwardly projecting suspension rod 128, a spring 129 which holds the armature yieldingly in its elevated position and is interposed between the upper side of the cross-bar 150 and a collar 130 on the suspension rod, and an electro-magnetic coil 131 having its pole 132 arranged below the free end of the armature and mounted on a hanger 133 secured to the lower end of the vibrating rod.

An alternating electric current is supplied to the electro-magnetic coils of the several vibrators from a generator 134 or other source which causes the same to be successively attracted and released to be retracted by the springs 129 in rapid succession so that a vibrating effect is imparted to the rods which suspend the same from the container supporting platforms and thereby cause the containers to be vibrated so that the powder settles in the same compactly.

The vibration of the containers is preferably imparted to the same only while they are being filled and means are therefore provided for closing the circuit of the electromagnets while the containers are at the filling stations and opening said circuit while the containers are being fed to and from the filling stations. The preferred means for accomplishing this purpose consists of a pair of switch contacts 135, 136 forming part of the electric circuit of the several vibrating electro-magnets, and a plurality of short rotary switch segments 137 mounted on the shaft 40 and adapted to engage both the contacts 135, 136 and close the electric circuit for operating the vibrators while the containers were located at the filling stations, but to be out of engagement from said contacts and break the electric circuit so as to arrest the operation of the vibrators at other times.

The platforms are able to vibrate in response to the action of the electro-magnets and armatures due to the yielding support on which the platform sections are mounted.

After the filling of a gang of containers has been completed the several filling heads are raised clear of the respective containers and then the filled containers are removed from the filling stations and replaced by another gang of empty containers. This is preferably accomplished by causing each container of the empty gang which is moved from the feeding belt to the filling station to push the respective filled container from its filling station rearwardly on to an intermediate or transfer table 151 arranged lengthwise along the rear side of the filling station.

The filled containers remain on this transfer table until the following gang of containers have also been filled and then pushed away from the filling stations by the next following empty containers, whereby the containers are pushed onto the upper stretch of a delivery conveyer belt 138 adapted to carry the filled containers to the place where the same are closed or otherwise disposed of. This delivery belt is arranged lengthwise in rear of the transfer table and passes with its opposite turns around pulleys 139, 140 mounted on the adjacent part of the main frame. Motion for operating this delivery belt so as to start and stop in unison with the feeding belt is preferably effected by a transverse shaft 141 provided with a gear pinion 142 meshing with the gear wheel 28, and a longitudinal shaft 143 connected at one end by intermeshing bevel gear wheels 144 with the transverse shaft 141 and connected at its opposite end by a pair of intermeshing bevel gear wheels 145 with the shaft 146 which carries the delivery pulley 140 of the delivery belt, as shown in Figs. 2 and 8.

Instead of centering each filling head on the respective container by a conical nozzle on the head engaging with the inner side of the open end of the container, as shown in Fig. 15, this effect may be obtained by the modified form of the head shown in Fig. 18 in which outer side of the open end of the container is engaged by the conical bore 154 of a centering ring 147 which is guided on pins 148 depending from the filling head and yieldingly held in its depressed position by a spring 149 interposed between said head and centering ring.

I claim as my invention:—

1. A machine for filling containers having filling stations, and comprising means for conveying containers in a row adjacent to said filling stations, and means for moving some of said containers from said conveying means to said filling stations, including a plurality of fingers a transversely reciprocating carrier having a plurality of guideways in each of which one of said fingers is slidable transversely and also having a pocket opening into each of said guideways, a detent member arranged in each pocket and engaging the respective finger, and a spring in each pocket for holding the detent member therein against the corresponding finger.

2. A machine for filling containers having filling stations, and comprising means for conveying containers in a row adjacent to said filling stations, and means for moving some of said containers from said conveying means to said filling stations including a plurality of; guideways for directing the containers from said conveying means to said filling stations and a vertically movable gate for controlling the movement of said containers from said conveying means to said guideways and having passages in its upper edge adapted to register with the entrance of said guideways and the lower part of said gate being adapted to obstruct the entrance to said guideways.

3. A machine for filling containers comprising a plurality of container filling devices arranged in a row of receiving stations spaced definite distances from each other to permit containers of different diameters to be placed in the receiving positions relative to said filling devices; a plurality of guides arranged in a row and each having its outlet arranged in line with the receiving station of one of said filling devices; means for propelling a row of containers in close order to the inlets of said guides; and means for pushing some of said containers in irregular order from said row of containers into said guideways and to said receiving stations, said pushers being arranged in irregularly spaced relation so that in at least one part of said row of containers a single container will be removed from between adjacent containers in said row, and in at least another part of said row of containers two adjacent containers will be removed from said row.

4. A machine for filling containers comprising a plurality of container filling devices arranged in a row of receiving stations spaced definite distances from each other to permit containers of different diameters to be placed in the receiving positions relative to said filling devices; a plurality of guides arranged in a row and each having its outlet arranged in line with the receiving station of one of said filling devices; means for propelling a row of containers in close order to the inlets of said guides; and means for pushing some of said containers in irregular order from said row of containers into said guideways and to said receiving stations, said pushers being arranged in irregularly spaced relation so that in at least one part of said row of containers a single container will be removed from between adjacent containers in said row, in at least another part of said row of containers two adjacent containers will be removed from said row and in at least another part of said row of containers three adjacent containers will be removed from said row.

5. A machine for filling containers comprising a plurality of container filling devices arranged in a row of receiving stations spaced definite distances from each other to permit containers of different diameters to be placed in the receiving positions relative to said filling devices; a plurality of guides arranged in a row and each having its outlet arranged in line with the receiving station of one of said filling devices; means for propelling a row of containers in close order to the inlets of said guides; and pushers for moving some of said containers in irregular order from said row of containers to said guideways and to said receiving stations, said pushers being arranged in irregularly spaced relation so that in one part of said row of containers a single container will be removed from between adjacent containers in said row, and in another part of said row of containers a plurality of adjacent containers will be removed from said row.

In testimony whereof I hereby affix my signature.

ROBERT N. CUNDALL.